United States Patent [19]
Liao

[11] Patent Number: 5,245,945
[45] Date of Patent: Sep. 21, 1993

[54] AQUARIUM ASSEMBLY HAVING PARTITION FORMING AERATION/FILTER CHAMBER

[76] Inventor: Chung-Han Liao, No. 63, Alley 21, Lane 177, Ta-Hsing St., Taichung City, Taiwan

[21] Appl. No.: 24,612
[22] Filed: Mar. 1, 1993
[51] Int. Cl.$^5$ .......................................... A01K 63/04
[52] U.S. Cl. ................................ 119/248; 119/261; 119/263; 119/265
[58] Field of Search ................. 119/5, 3; 210/416.2

[56] References Cited

U.S. PATENT DOCUMENTS

| | | | |
|---|---|---|---|
| 3,149,608 | 9/1964 | Murphy | 119/5 |
| 3,255,731 | 6/1966 | Girard | 119/5 |
| 3,720,318 | 3/1973 | Cohen | 119/5 |
| 3,815,547 | 6/1974 | Willinger et al. | 119/5 |
| 4,606,821 | 8/1986 | D'Imperio | 119/5 |
| 5,092,991 | 3/1992 | Ogawa | 119/5 |

FOREIGN PATENT DOCUMENTS 2239402  7/1991  United Kingdom .......... 119/5

Primary Examiner—Cary E. O'Connor
Assistant Examiner—Todd E. Manahan
Attorney, Agent, or Firm—Christie, Parker & Hale

[57] ABSTRACT

A novel aquarium assembly includes a transparent fish tank that is made of integrally molded plastic. The fish tank confines large and small receiving spaces therein. A top cover is mounted removably on the open top of the fish tank and is formed with an opening to access the large receiving space. A U-shaped filter strip is disposed inside the small receiving space and divides the small receiving space into a first compartment and two second compartments on two sides of the first compartment. The second compartments are communicated directly with the large receiving space. An aeration unit includes a vertical water tube, which is disposed in the first compartment and which has a lower open end that is communicated with the first compartment and a top open end that extends toward a top of the large receiving space and that is formed with a radial hole, and an air tube which has a first end that is connected to an aeration pump and a second end that extends into the water tube via the radial hole and that is connected to a porous plug.

6 Claims, 6 Drawing Sheets

AQUARIUM ASSEMBLY HAVING PARTITION FORMING AERATION/FILTER CHAMBER

BACKGROUND OF THE INVENTION

1. Field of the Invention

The invention relates to an aquarium, more particularly to a novel aquarium assembly.

2. Description of the Related Art

A conventional aquarium assembly includes a fish tank which is made of glass or acrylic panels that are bonded together by means of a silicone sealant. It is also known in the related art that circulation, filtering and aeration of water in the fish tank are conducted separately.

Referring to FIG. 1, a pump (2) is mounted on a fish tank (1) of a conventional aquarium assembly and is responsible for water circulation in the latter. The pump (2) is connected to inlet and outlet pipes (3, 4). The inlet pipe (3) extends to the bottom of the fish tank (1) and serves as a passage for water drawn therefrom. The outlet pipe (4) serves as a passage for returning water to the fish tank (1). Water drawn by the pump (2) is usually filtered before being returned to the fish tank (1). In a conventional aquarium assembly, a frame (5) is mounted on top of the fish tank (1) and is provided with a filter unit (6), as shown in FIG. 2. Water drawn by the pump (2) passes through the frame (5) and the filter unit (6) before being returned to the fish tank (1). Referring to FIG. 3, the conventional aquarium assembly is further provided with an aeration unit (7). The aeration unit (7) has a tube (8) which extends into the fish tank (1).

The drawbacks of the conventional aquarium assembly are as follows:

1. The fish tank (1) is made of glass or acrylic panels which are bonded together by means of a sealant. The glass or acrylic panels are relatively heavy, making it inconvenient to carry or transport the fish tank (1). Moreover, the glass or acrylic panels break easily. Furthermore, water leakage can occur if the sealant was not applied properly.

2. A pump (2) and an aeration unit (7) are required to effect circulation and aeration of water in the fish tank (1). The pump (2) and the aeration unit (7) require separate motors, thereby increasing the costs incurred and the electrical consumption of the aquarium assembly. Furthermore, a frame (5) is required to mount the filter unit (6) on the fish tank (1).

3. The fish tank (1) confines only one receiving space. Large fish and freshly hatched fish are both provided in the receiving space, thereby permitting the large fish to eat up the freshly hatched fish.

SUMMARY OF THE INVENTION

The objective of the present invention is to provide an aquarium assembly with a novel construction.

More specifically, the objective of the present invention is to provide a novel aquarium assembly in which a single pump is used to circulate and aerate water in a fish tank, and in which filtering, aeration and water circulation are achieved in a single operation.

Another objective of the present invention is to provide a novel aquarium assembly which has a one-piece transparent fish tank. The fish tank has a lower manufacturing cost, can be conveniently carried and transported, and does not break or leak easily.

Still another objective of the present invention is to provide a novel aquarium assembly which has a fish tank that confines a large receiving space for large fish and a small receiving space for small fish, thereby preventing the large fish from eating up the small fish.

Accordingly, the preferred embodiment of a novel aquarium assembly of the present invention comprises:

a fish tank including an integrally molded transparent case that is made of a transparent plastic material, said transparent case having an open top and confining a hollow space therein, said transparent case further having a vertical partition plate which divides the hollow space into a large receiving space and a small receiving space;

a top cover mounted removably on the open top of the transparent case to cover the large and small receiving spaces, said top cover having a flat top panel which is formed with an opening to access the large receiving space, said top cover further having a movable lid being provided in the opening and having one side which is pivoted to the top panel so as to permit movement of the movable lid between open and closed positions, said movable lid being formed with a plurality of air holes;

a filter strip including a U-shaped elongated body which is disposed inside the small receiving space and which divides the small receiving space into a first compartment and two second compartments on two sides of the first compartment, said partition plate being formed with through openings to communicate directly the second compartments and the large receiving space; and an aeration unit including: a vertical water tube which is disposed in the first compartment and which has a lower open end that is communicated with the first compartment and a top open end that extends through the partition plate toward a top of the large receiving space and that is formed with a radial hole; an aeration pump for charging air into water in the transparent case; and an air tube having a first end which is connected to the air pump and a second end which extends into the water tube via the radial hole and which is connected to a porous plug.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED

Figure 1:
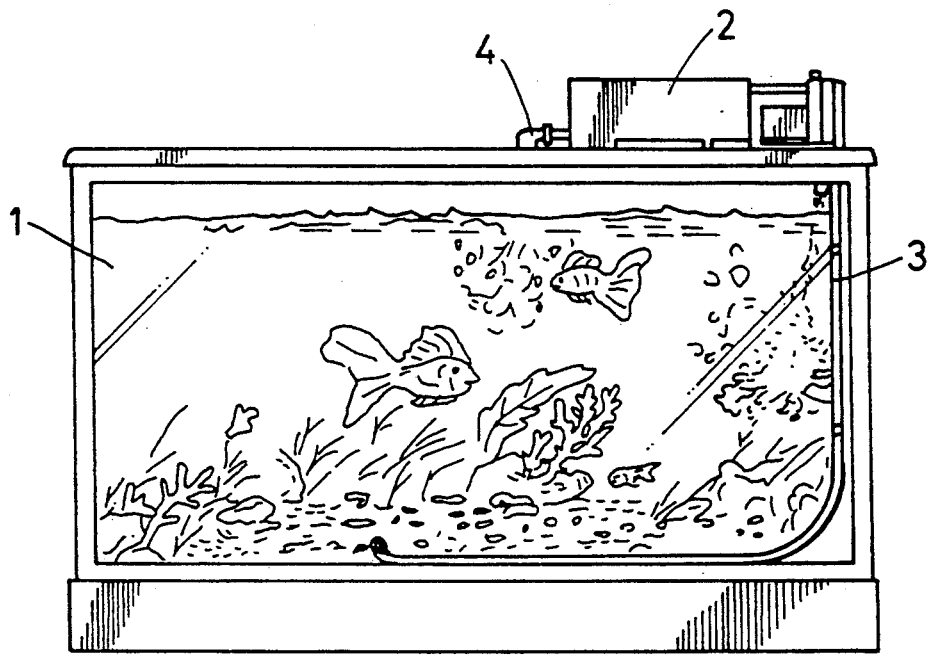
FIG. 1 is an illustration of a conventional aquarium assembly.
Figure 2:
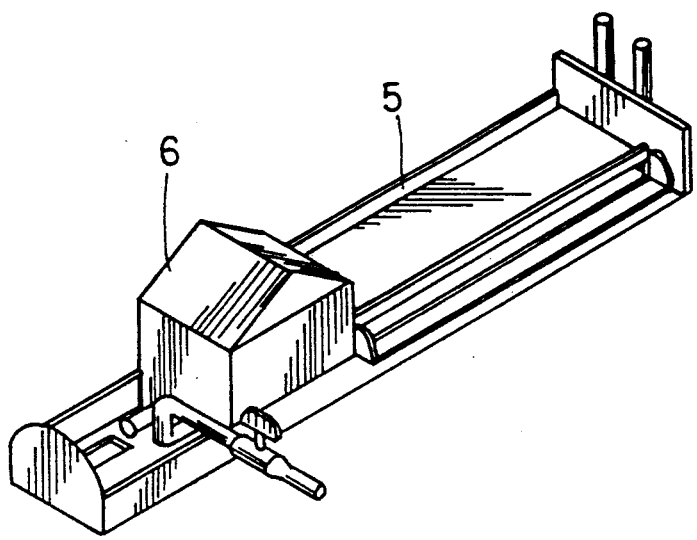
FIG. 2 is a perspective view of a frame which is used to support a filter unit on a conventional fish tank.
Figure 3:
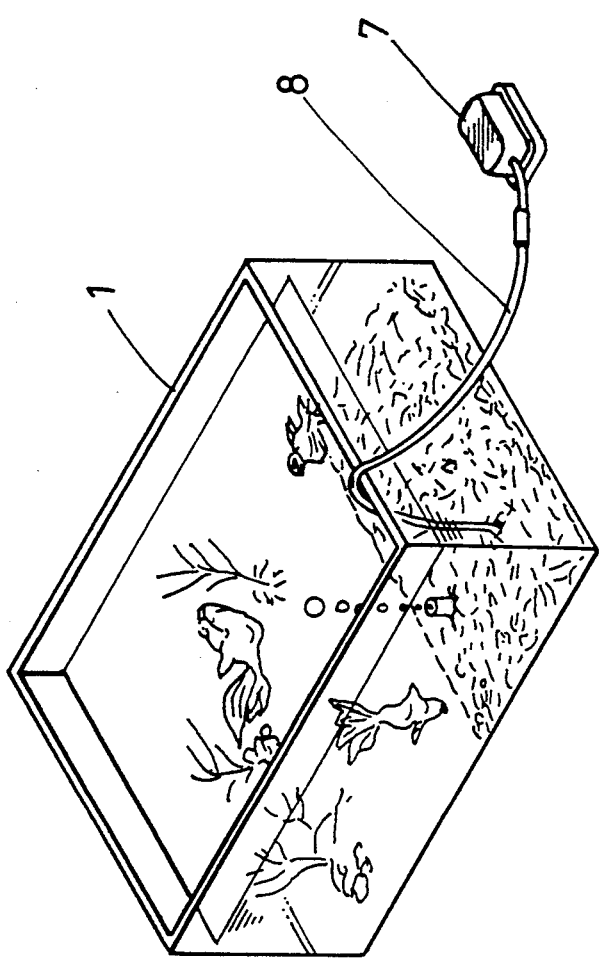
FIG. 3 is an illustration of a conventional aquarium assembly which is provided with an aeration unit.
Figure 4:
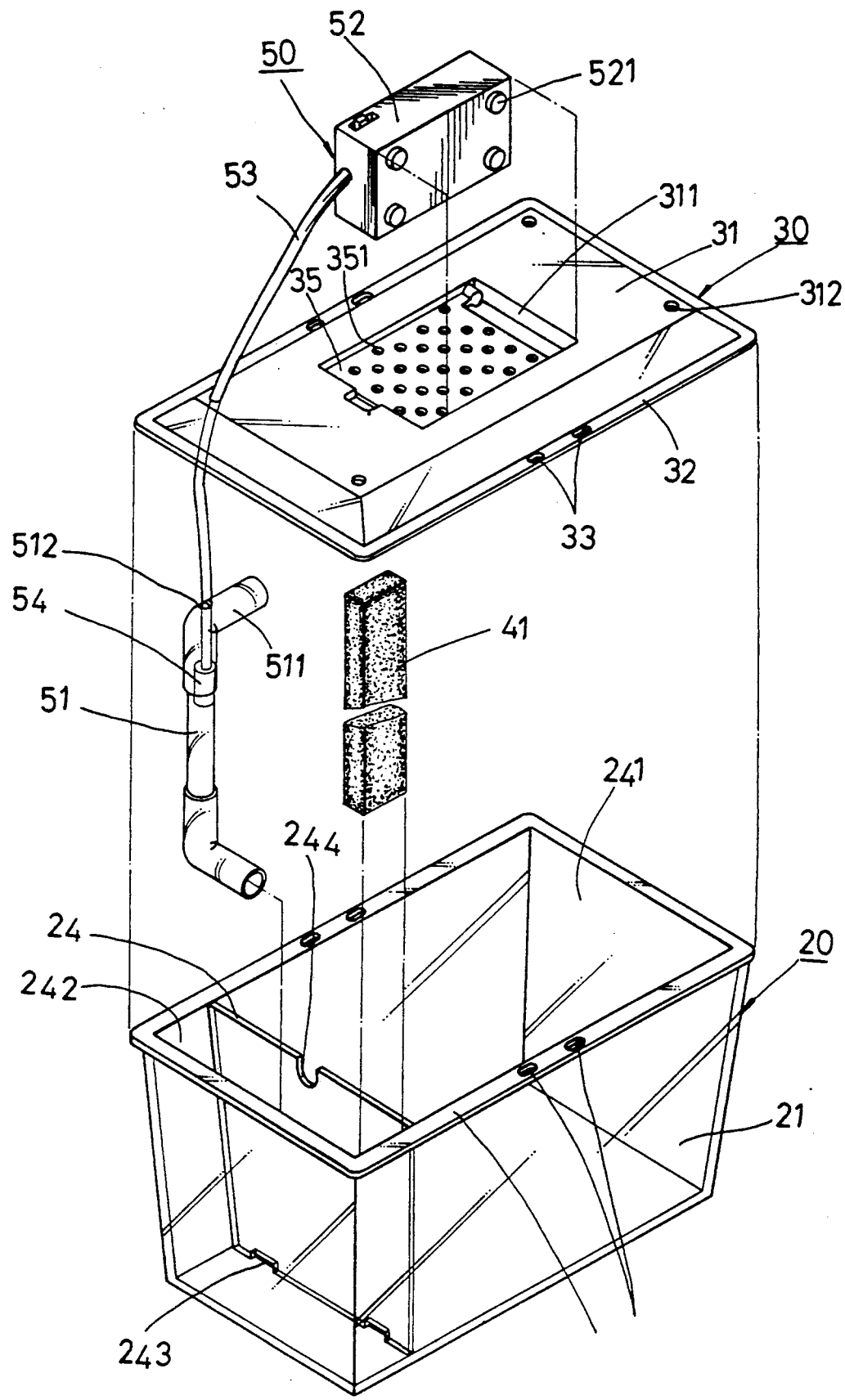
FIG. 4 is an exploded view of the preferred embodiment of a novel aquarium assembly according to the present invention.
Figure 5:
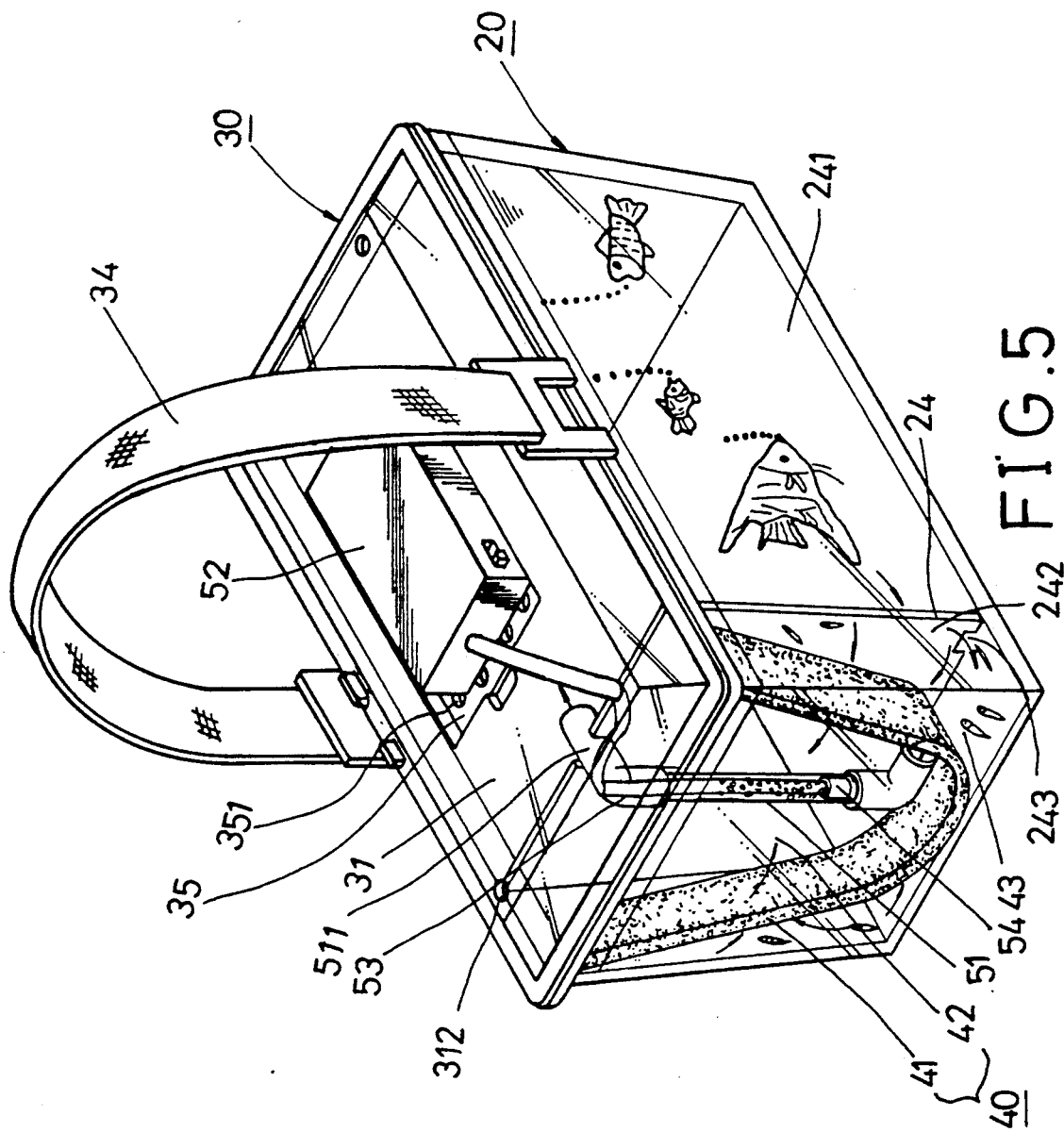
FIG. 5 is a perspective view of the preferred embodiment.

Referring to FIGS. 4 and 5, the preferred embodiment of a novel aquarium assembly according to the present invention is shown to comprise a fish tank (20), a top cover (30), a filter strip (40) and an aeration unit (50).

The fish tank (20) includes a transparent rectangular case (21) which is a one-piece injection molded member that is made of a transparent plastic material, such as polycarbonate (PC) plastic steel. The rectangular case (21) has an open top which is provided with an outward peripheral flange (22). The peripheral flange (22) includes two longer portions which respectively have an intermediate portion that is formed with a pair of spaced retaining holes (23). A vertical partition plate (24) is disposed inside the rectangular case (21) and extends across the longer portions of the peripheral flange (22) so as to divide the hollow space confined by the rectangular case (21) into a large receiving space (241) and a small receiving space (242). The partition plate (24) has a lower end which is formed with a pair of through openings (243), each being disposed adjacent to a respective one of two vertical sides of the partition plate (24). The through openings (243) serve to communicate the large and small receiving spaces (241, 242). The partition plate (24) further has a top end which is formed with a notch (244).

The top cover (30) is mounted removably on the open top of the rectangular case (21). The top cover (30) covers the large and small receiving spaces (241, 242) and is shaped as a truncated rectangular pyramid with a flat top panel (31). The top panel (31) is formed with an opening (311) to access the large receiving space (241). The top cover (30) is further formed with an outward peripheral flange (32) which is supported on the peripheral flange (22) of the rectangular case (21) when the top cover (30) is provided on the latter. The peripheral flange (32) is formed with two pairs of spaced retaining holes (33) which ar aligned with the retaining holes (23) in the peripheral flange (22). Referring to FIG. 5, a strap (34) has two ends which are fastened detachably to the rectangular case (21) and to the top cover (30) at the retaining holes (23, 33). The strap (34) facilitates carrying of the aquarium assembly of the present invention. A movable lid (35) is provided in the opening (311) and has one side which is pivoted to the top panel (31). The movable lid (35) is thus movable between open and closed positions. The movable lid (35) is formed with a plurality of air holes (351).

The filter strip (40) includes an elongated body (41) which has a predetermined length and thickness. The elongated body (41) is bent into the shape of the letter "U" when disposed inside the small receiving space (242), as shown in FIG. 5. The elongated body (41) has two side faces which contact respectively the rectangular case (21) and the partition plate (24). The elongated body (41) divides the small receiving space (242) into a first compartment (42) and two second compartments (43) on two sides of the first compartment (42). The second compartments (43) are communicated directly with the large receiving space (241) via a respective one of the through openings (243).

The aeration unit (50) includes a vertical water tube (51) which is disposed in the first compartment (42) and which has a lower open bent end that extends towards the bottom of the rectangular case (21) and that is communicated with the first compartment (42). The water tube (51) further has a top open end (511) which is bent so as to extend toward the top of the large receiving space (241) via the notch (244) in the partition plate (24). An aeration pump (52) has a bottom which is provided with four legs (521) that serve to position the aeration pump (52) on the movable lid (35). The bottom of the aeration pump (52) thus forms a clearance with the movable lid (35), thereby permitting air flow through the air holes (351). The aeration pump (52) charges air into water in the rectangular case (21) via an air tube (53). The air tube (53) has one end which extends into a small radial hole (512) in the water tube (51) via a small hole (312) in the top cover (30) and which is connected to a porous plug (54).

Figure 6:
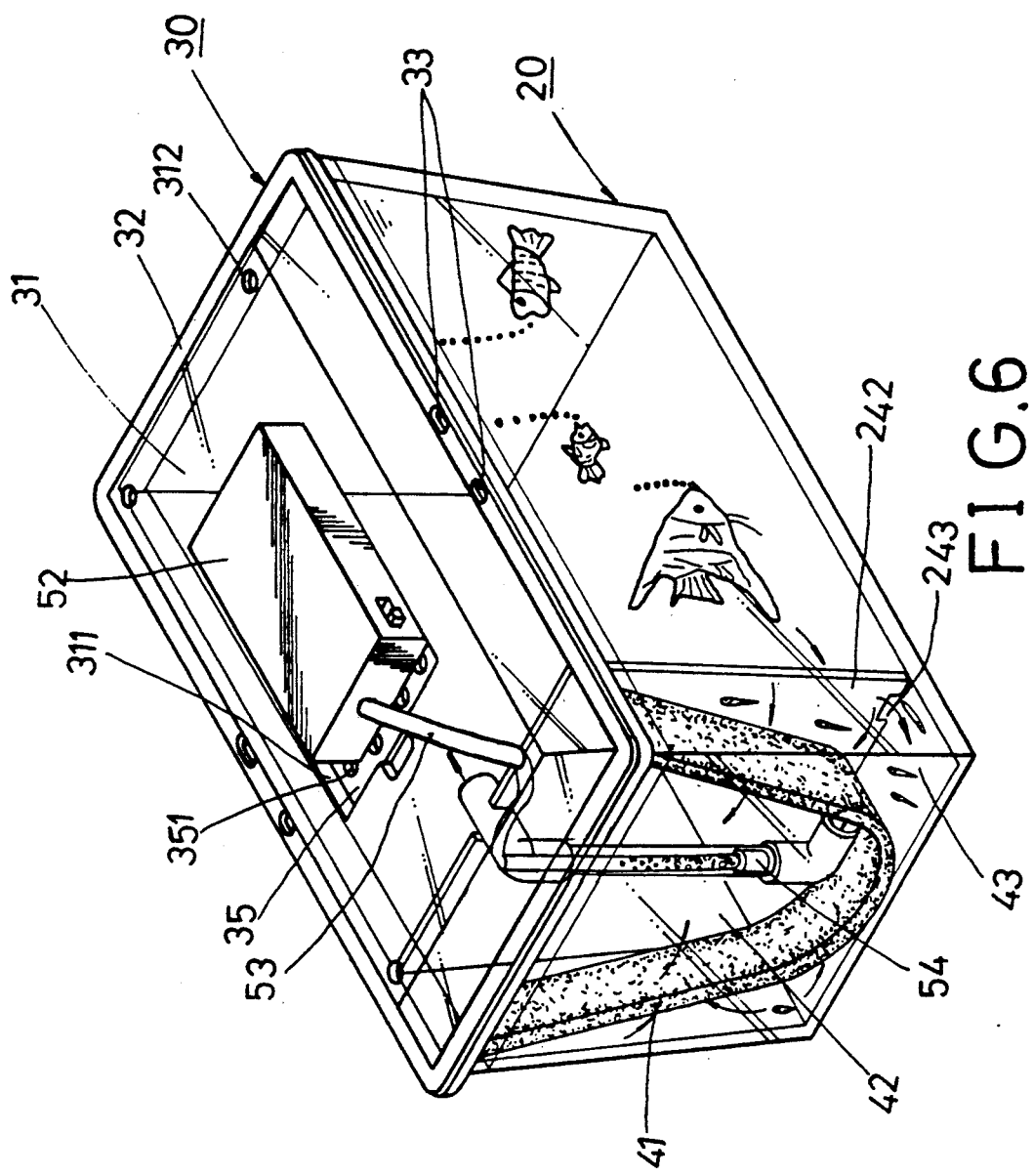
FIG. 6 illustrates how water is circulated in the preferred embodiment.

Referring to FIG. 6, when the preferred embodiment is in use, water is first supplied to the large and small receiving spaces (241, 242) of the rectangular case (211). The through openings (243) communicate the large and small receiving spaces (241, 242). Water in the second compartments (43) is filtered as it passes through the elongated body (41) so as to reach the first compartment (42). Water is supplied continuously to the rectangular case (21) until the water level in the water tube (51) is higher than the level of the porous plug (54) therein.

When the aeration pump (52) charges air into the water tube (51), air bubbles are formed in the latter due to the porous plug (54). The air bubbles mix with water in the water tube (51), thereby causing the water in the water tube (51) to rise and reach the top open end (511) so as to fall into the large receiving space (241).

Water is filtered as it flows into the first compartment (42) via elongated body (41). As water is transferred from the small receiving space (242) to the large receiving space (241), the water level in the small receiving space (242) decreases. Water from the large receiving space (241) flows into the small receiving space (242) via the through openings (243) in order to maintain the water levels in the large and small receiving spaces (241, 242) equal.

It has thus been shown that water circulation, filtering and aeration are effected during a single operation in the present invention. Only one motor is required so as to drive the aeration pump (52) in order to accomplish water circulation and aeration.

Figure 7:
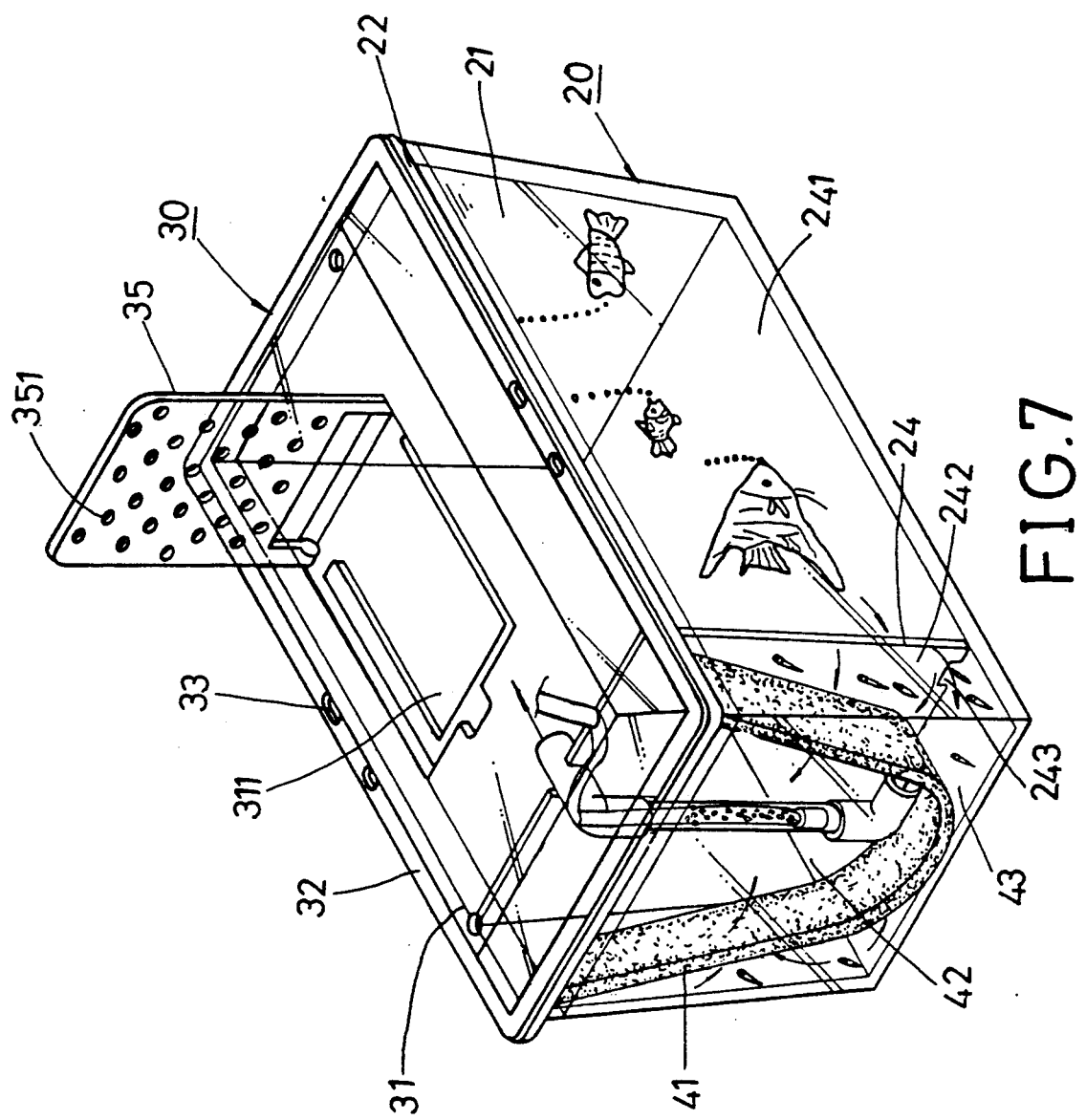
FIG. 7 is another perspective view of the preferred embodiment illustrating a movable lid thereof when opened.

Referring to FIGS. 6 and 7, the aquarium assembly of the present invention is capable of separating large fish from newly hatched fish. The large fish are placed in the large receiving space (241). The newly hatched fish in the large receiving space (242) can swim into one of the second compartments (43) of the small receiving space (241) via the through openings (243), thereby protecting the newly hatched fish from the large fish. The elongated body (41) further prevents fish in the second compartments (43) from reaching the first compartment (42). The newly hatched fish are thus prevented from being drawn by the action of the aeration pump (52).

Referring to FIG. 7, the movable lid (35) can be opened to permit feeding of fish in the large receiving space (241) and to permit the removal of sick fish in the latter. There is thus no need to remove the top cover (30) from the rectangular case (21). The legs (521) of the aeration pump (52) permit positioning of the latter on the movable lid (35). Furthermore, the aeration pump (52) does not prevent air flow into the large receiving space (241) via the air holes (351) in the movable lid (35) because of the clearance formed between the bottom of the aeration pump (52) and the movable lid (35).

In addition, the fish tank (20) is a one-piece integrally molded member that is made of transparent PC plastic steel. The manufacturing cost of the fish tank (20) is lower than that of the prior art, and the fish tank (20)

does not break or leak easily. Moreover, the fish tank (20) is relatively light, thus facilitating carrying and transport of the same. The strap (34) is installed to further facilitate carrying and transport of the novel aquarium assembly of the present invention.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An aquarium assembly, comprising:
   a fish tank including an integrally molded transparent case that is made of a transparent plastic material, said transparent case having an open top and confining a hollow space therein, said transparent case further having a vertical partition plate which divides said hollow space into a large receiving space and a small receiving space;
   a top cover mounted removably on said open top of said transparent case to cover said large and small receiving spaces, said top cover having a flat top panel which is formed with an opening to access said large receiving space, said top cover further having a movable lid being provided in said opening and having one side which is pivoted to said top panel so as to permit movement of said movable lid between open and closed positions, said movable lid being formed with a plurality of air holes;
   a filter strip including a U-shaped elongated body which is disposed inside said small receiving space and which divides said small receiving space into a first compartment and two second compartments on two sides of said first compartment, said partition plate being formed with through openings to communicate directly said second compartments and said large receiving space; and
   an aeration unit including a vertical water tube which is disposed in said first compartment and which has a lower open end that is communicated with said first compartment and a top open end that extends through said partition plate toward a top of said large receiving space and that is formed with a radial hole; an aeration pump for charging air into water in said transparent case; and an air tube having a first end which is connected to said air pump and a second end which extends into said water tube via said radial hole and which is connected to a porous plug.

2. The aquarium assembly as claimed in claim 1, wherein said transparent plastic material is polycarbonate plastic steel.

3. The aquarium assembly as claimed in claim 1, wherein:
   said open top of said transparent case is provided with an outward peripheral flange that is formed with two sets of first retaining holes;
   said top cover is formed with an outward peripheral flange which is supported on said peripheral flange of said transparent case when said top cover is provided on said transparent case, said peripheral flange of said top cover being formed with two sets of second retaining holes which are aligned with said first retaining holes; and
   said aquarium assembly further comprises a strap which has two ends that are fastened detachably to said transparent case and said top cover at said first and second retaining holes.

4. The aquarium assembly as claimed in claim 1, wherein said through openings are formed in a lower end of said partition plate and are disposed adjacent to a respective one of two vertical sides of said partition plate.

5. The aquarium assembly as claimed in claim 1, wherein said partition plate has a top end which is formed with a notch, said top open end of said water tube being bent and extending toward said large receiving space via said notch.

6. The aquarium assembly as claimed in claim 1, wherein said aeration pump has a bottom which is provided with four legs that serve to position said aeration pump on said movable lid.

* * * * *

UNITED STATES PATENT AND TRADEMARK OFFICE
CERTIFICATE OF CORRECTION

PATENT NO. : 5,245,945

DATED : September 21, 1993

INVENTOR(S) : Chung Han Liao

It is certified that error appears in the above-indentified patent and that said Letters Patent is hereby corrected as shown below:

On the title page:

[76] Inventor: change "Chung-Han Liao" to -- Chung Han Liao --

Column 1, line 54, start a new paragraph with "The objective of . . ."

Column 2, line 27, after "directly" insert -- with --.
Column 2, line 66, after "PREFERRED" insert -- EMBODIMENT --.

Column 3, page 36, after "which" change "ar" to -- are --.

Column 4, line 4, change "air flow" to -- airflow --.
Column 4, line 12, change "(211)" to -- (21) --.
Column 4, line 35, change "equal" to -- equally --.
Column 4, line 61, change "air flow" to -- airflow --.

UNITED STATES PATENT AND TRADEMARK OFFICE
CERTIFICATE OF CORRECTION

PATENT NO. : 5,245,945
DATED : September 21, 1993
INVENTOR(S) : Chung Han Liao

It is certified that error appears in the above-indentified patent and that said Letters Patent is hereby corrected as shown below:

Column 5, line 39, after "directly" insert -- with --.

Signed and Sealed this

Fourth Day of October, 1994

Attest:

BRUCE LEHMAN

*Attesting Officer*  *Commissioner of Patents and Trademarks*